United States Patent
Benton et al.

(10) Patent No.: US 10,152,477 B2
(45) Date of Patent: Dec. 11, 2018

(54) COMMUNICATION METHOD AND SYSTEM FOR ACCESSING MEDIA DATA

(71) Applicant: International Business Machines Corporation, Armonk, NY (US)

(72) Inventors: Brent Benton, North Vancouver (CA); Thomas Hampp-Bahnmueller, Stuttgart (GE); Dana W. Morris, Arlington, VA (US); Daniel Pittner, Steinenbronn (DE); Thomas Schaeck, Achern (DE); Dieter Schieber, Jettingen (DE)

(73) Assignee: International Business Machines Corporation, Armonk, NY (US)

(*) Notice: Subject to any disclaimer, the term of this patent is extended or adjusted under 35 U.S.C. 154(b) by 237 days.

(21) Appl. No.: 14/615,555

(22) Filed: Feb. 6, 2015

(65) Prior Publication Data
US 2015/0263984 A1   Sep. 17, 2015

(30) Foreign Application Priority Data
Mar. 14, 2014   (GB) .................................. 1404522.3

(51) Int. Cl.
*G06F 17/30* (2006.01)
*H04L 29/08* (2006.01)

(52) U.S. Cl.
CPC ............ *G06F 17/30* (2013.01); *H04L 67/104* (2013.01)

(58) Field of Classification Search
CPC .............................. G06F 17/30; H04L 67/104
(Continued)

(56) References Cited

U.S. PATENT DOCUMENTS 5,870,559 A * 2/1999 Leshem .................. G06F 11/32
707/E17.116
6,285,999 B1 * 9/2001 Page ................. G06F 17/30728
(Continued)

FOREIGN PATENT DOCUMENTS

WO   2009077789 A1   6/2009

OTHER PUBLICATIONS

Application No. 1404522.3 (United Kingdom), titled "Communication Method and System for Accessing Media Data," filed on Mar. 14, 2014.
(Continued)

*Primary Examiner* — Philip J Chea
*Assistant Examiner* — Wing Ma
(74) *Attorney, Agent, or Firm* — Anthony R. Curro

(57) ABSTRACT

Providing access to media data shared by multiple users. A predefined edge weight is assigned to each edge of a linked data structure based on a dependency category of the edge. A first access rating value is assigned to each node. A rating residue value is calculated as the difference between the two first access rating values of the nodes connected by each edge. The data structure is traversed from a seed node, and for each edge traversed, calculating a second access rating value using an edge weight value and the first access rating value. Repeating until the rating residue values meet a predefined convergence criterion. The nodes having access rating values meeting a predefined data removal criterion are selected from the nodes of the linked data structure. The data entities corresponding to the selected nodes are then removed.

13 Claims, 8 Drawing Sheets

(58) Field of Classification Search
USPC .......................................................... 709/217
See application file for complete search history.

(56) References Cited

U.S. PATENT DOCUMENTS

| | | | | |
|---|---|---|---|---|
| 6,356,902 | B1* | 3/2002 | Tan ................... | G06F 17/30017 |
| 6,509,898 | B2* | 1/2003 | Chi .................... | G06F 17/30014 |
| | | | | 345/440 |
| 7,086,012 | B1* | 8/2006 | Perttunen .......... | G06F 17/30961 |
| | | | | 345/440 |
| 7,162,480 | B2* | 1/2007 | Vishik ............... | G06F 17/30734 |
| | | | | 707/616 |
| 7,447,729 | B1* | 11/2008 | Thakur ................ | G06F 17/30 |
| | | | | 709/200 |
| 8,195,617 | B2 | 6/2012 | Callanan et al. | |
| 8,195,695 | B2* | 6/2012 | Cubranic .......... | G06F 17/30477 |
| | | | | 707/791 |
| 8,250,040 | B2 | 8/2012 | Murphy et al. | |
| 8,515,983 | B1* | 8/2013 | Snyder, II ......... | G06F 17/30985 |
| | | | | 707/760 |
| 8,954,440 | B1* | 2/2015 | Gattani ............. | G06F 17/30011 |
| | | | | 707/738 |
| 9,286,378 | B1* | 3/2016 | Zarakhovsky .... | G06F 17/30705 |
| 9,477,758 | B1* | 10/2016 | Tong ................ | G06F 17/30864 |
| 2002/0133516 | A1* | 9/2002 | Davis ................... | G06F 17/243 |
| | | | | 715/205 |
| 2003/0120662 | A1* | 6/2003 | Vishik ............... | G06F 17/30734 |
| 2004/0107270 | A1 | 6/2004 | Stephens et al. | |
| 2007/0016579 | A1* | 1/2007 | Kaul ................. | G06F 17/30864 |
| 2007/0083532 | A1* | 4/2007 | Ishida ............... | G06F 17/30551 |
| 2007/0106551 | A1 | 5/2007 | McGucken | |
| 2008/0097958 | A1* | 4/2008 | Ntoulas ............. | G06F 17/30864 |
| 2008/0134015 | A1* | 6/2008 | Milic-Frayling ... | G06F 17/3089 |
| | | | | 715/206 |
| 2008/0288646 | A1* | 11/2008 | Hasha ................ | H04L 67/1095 |
| | | | | 709/228 |
| 2009/0132519 | A1 | 5/2009 | Rathod et al. | |
| 2010/0095164 | A1 | 4/2010 | Kamei et al. | |
| 2010/0262717 | A1* | 10/2010 | Critchley ............... | H04L 12/42 |
| | | | | 709/251 |
| 2011/0167030 | A1* | 7/2011 | Bremler-Barr ......... | G06N 5/003 |
| | | | | 706/48 |
| 2011/0276915 | A1* | 11/2011 | Freire .................. | G06Q 10/00 |
| | | | | 715/772 |
| 2012/0109966 | A1* | 5/2012 | Liang ................ | G06F 17/30643 |
| | | | | 707/740 |
| 2012/0159455 | A1* | 6/2012 | Schmelter ........... | G06F 11/3409 |
| | | | | 717/130 |
| 2012/0182882 | A1* | 7/2012 | Chrapko ................ | G06Q 30/02 |
| | | | | 370/248 |
| 2012/0317200 | A1* | 12/2012 | Chan ................... | G06F 17/3064 |
| | | | | 709/204 |
| 2013/0013807 | A1* | 1/2013 | Chrapko ................ | H04L 41/12 |
| | | | | 709/238 |
| 2013/0166600 | A1* | 6/2013 | Snyder, II ......... | G06F 17/30958 |
| | | | | 707/797 |
| 2013/0166601 | A1* | 6/2013 | Chrapko ................ | G06Q 10/00 |
| | | | | 707/798 |
| 2014/0059063 | A1* | 2/2014 | Shimizu ............ | G06F 17/30345 |
| | | | | 707/756 |
| 2014/0114927 | A1* | 4/2014 | Anderson ................ | G06F 17/30 |
| | | | | 707/687 |
| 2014/0114982 | A1* | 4/2014 | Lamba ............... | G06F 17/30731 |
| | | | | 707/748 |
| 2014/0351271 | A1* | 11/2014 | Fairchild-Coppoletti ................... | |
| | | | | G06F 17/30038 |
| | | | | 707/749 |
| 2014/0372453 | A1* | 12/2014 | Rajaram ........... | G06F 17/30029 |
| | | | | 707/749 |
| 2015/0019640 | A1* | 1/2015 | Li ...................... | G06Q 30/0269 |
| | | | | 709/204 |

OTHER PUBLICATIONS

Search Report, Application No. 1404522.3 (United Kingdom), dated Sep. 12, 2014.
Johnston, "Enterprise Vault 10 Adds Social Content Archiving," INFOSTOR, Enterprise Project Management, Aug. 1, 2011, Accessed on Jan. 21, 2015.
International Business Machines Corporation, IBM Software, "IBM Content Collector for IBM Connections," Features, Compliance and eDiscovery for the IBM Connections Social Business Platform, http://www-01.ibm.com/software/ecm/content-collector/connections/, Accessed on Jan. 21, 2015.
RegEd, "Social Media Archiving and Surveillance; Power the Firm's Social Media Program, Compliantly, RegEd Solution," https://www.arkovi.com/social-media-archiving-faqs/, Accessed on Feb. 3, 2015.

* cited by examiner

COMMUNICATION METHOD AND SYSTEM FOR ACCESSING MEDIA DATA

BACKGROUND

The present invention relates to communication systems, and more particularly to a communication method for providing access to media data.

Media data content of wikis, blogs, forums, profiles, shared files, images, videos, etc. is becoming more frequently used and more important not only in the internet with its consumer oriented social collaboration and media platforms but also in enterprises. However, media data content increases in volume over years of use. The increased volume of these media data needs to be managed.

SUMMARY

Embodiments of the present invention disclose a method, computer program product, and system for providing access to media data shared by multiple users. The media data containing data entities having data dependencies between them. The data dependencies are classified into one or more dependency categories. A linked data structure is generated representing a hierarchy of the data entities. The linked data structure comprises nodes representing the data entities connected by edges, each edge of the edges being associated with the dependency category of the data dependency between the two data entities represented by the two nodes connected by the edge. At least one predefined edge weight is assigned to each edge of the linked data structure value based on the dependency category of the edge. A first access rating value is assigned to each node of the nodes quantifying the access, by at least part of the multiple users, to the data entity represented by the node. A node of the nodes of the linked data structure is selected as a seed node. For each edge of the linked data structure, a rating residue value is calculated as the difference between the two first access rating values of the nodes connected by the edge. The linked data structure is traversed starting from the seed node, and for each edge traversed starting from a source node to a destination node, calculating for the destination node a second access rating value using the at least one edge weight value of the edge and the first access rating value of the destination node and the source node. A seed node is selected, a rating residue value is calculated, and the linked data structure is traversed using the second access rating values as the first access rating values until at least part of the rating residue values meet a predefined convergence criterion. The nodes having access rating values meeting a predefined data removal criterion are selected from the nodes of the linked data structure. The data entities corresponding to the selected nodes are then removed.

DETAILED DESCRIPTION

Figure 1:
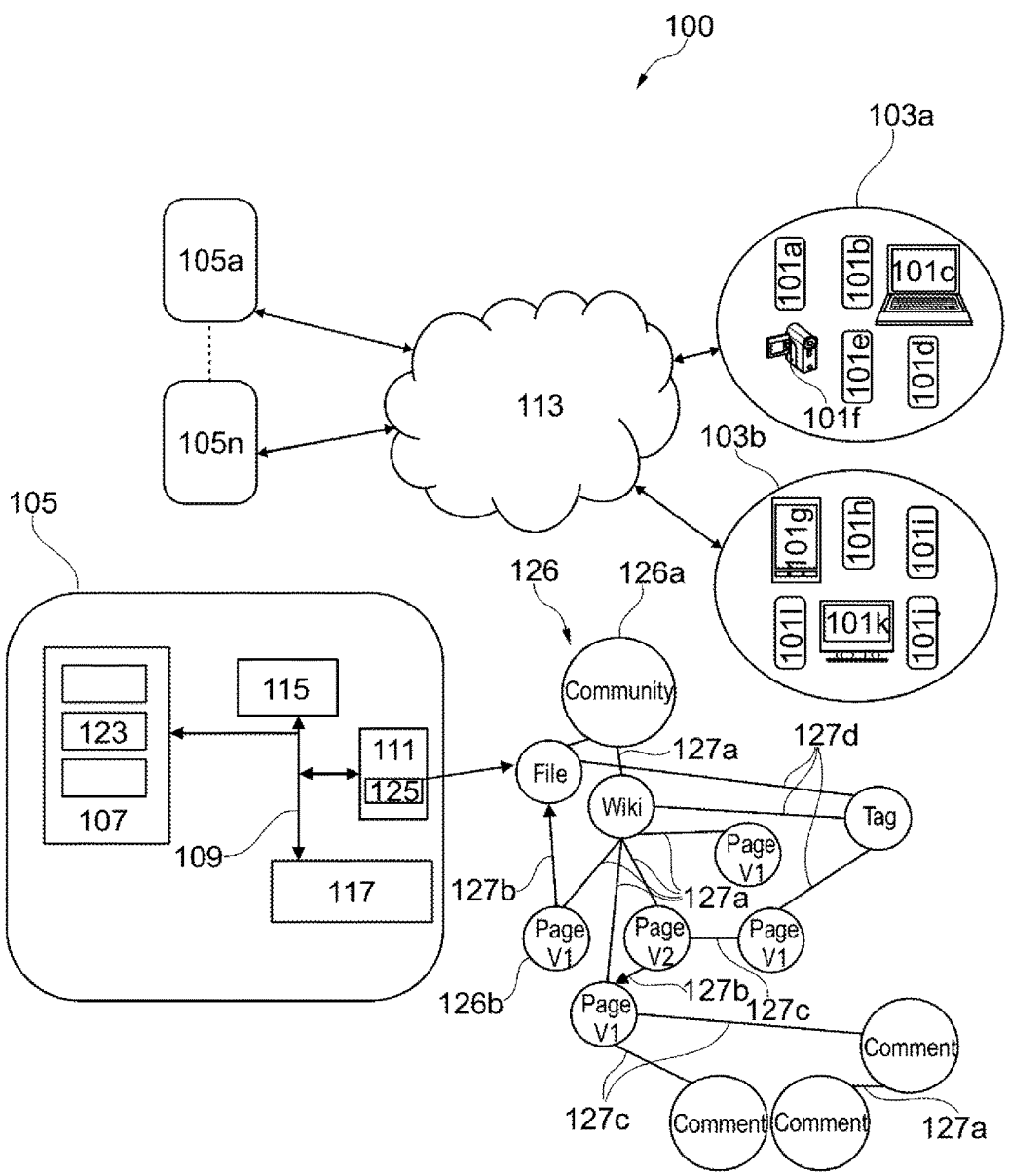
FIG. 1 illustrates an exemplary communication system for providing access to media data.

In the following, like numbered elements in the figures either designate similar elements or designate elements that perform an equivalent function. Elements which have been discussed previously will not necessarily be discussed in later figures if the function is equivalent.

The features of the disclosed communication method may have the advantage of saving resources that would otherwise be used by the removed data entities. The separation of data entities into data entities to be removed and data entities to be maintained may have the advantage of allowing a flexible usage of the resources in the sense that the allocation of resources for the data to be removed may be less constrained than the allocation of resources for those data to be maintained. For example, any free or less performing storage or processing resources (e.g. slow processing or slow access storage resources) may be allocated for the data entities to be removed. This assignment of resources depending on the relevance of data may improve the overall performance of the system executing the communication method. For example, by giving a highest execution and/or a storage priority to the data entities to be maintained, the system's response to the user requests may be faster than running on the whole data including data entities to be removed without prioritization. This is especially important since the user requests or other system requests may mainly concern the data to be maintained as they are more relevant.

For example, the media data are generated using a mobile application being installed on mobile devices of the multiple users, the media data being shared via mobile social media networking, the mobile application comprising one of a SharePoint application and a social application. This may be advantageous as the present method may be seamlessly integrated in telecommunication systems.

For example, the classification of a data dependency between a first and a second data entity of the data entities comprises classifying the data dependency into at least one of the one or more categories: a data version dependency category if the first data entity and the second data entity have different versions of the same content; a containment or nested data dependency category if the content of the first data entity comprises at least part of the content of the second data entity; a tagging data dependency if the first data entity is tagged similar to the second data entity; a link data dependency category if the first data entity comprises a link pointing to the second data entity. This may be advantageous at it may provide an accurate method for determining dependencies between the data entities that may, for example, be subsequently used for an efficient storage of the data entities. E.g. if the data dependency between two data entities comprises the containment data dependency category the two data entities may be stored in the same storage location.

For example, the assignment of at least one predefined edge weight value to an edge of the edges connecting a first and a second node representing the first and the second data entity respectively comprises: if the dependency category of the edge comprises the containment data dependency category assigning the at least one predefined edge weight value as the first access rating value of the first node when the link data structure is traversed from the first node to the second node; if the dependency category of the edge comprises the data version dependency category assigning the at least one predefined edge weight value as the percentage of the common content between the first data entity and the second data entity.

For example, the first access rating value of a data entity is derived from at least one of a total number of accesses to the data entity in a predefined time interval; an average number of accesses per user of the multiple users to the data entity in the predefined time interval; an assigned rating value from a user of the multiple users, the assigned rating value being indicative of a content quality of the data entity. This may be advantageous as it may provide a reliable classification of the data entities that may improve the performance of the system that manages such data entities based on that classification. Otherwise, managing data based on a wrong classification may lead to a wrong allocation of resources which may impact the performance of the system.

Data quality or content quality of a data entity may be characterized by the data freshness. For example, the first access rating value of a given node may be indicative of the data freshness of the data entity associated with the node. The data freshness of a data entity may be indicative of how stale is the data entity with respect to the source of the data entity (i.e. is the data entity has the same content as the corresponding data that is stored at the sources). This is if the data entity has been copied from a certain data source. The data freshness of the data entity may further indicate how old the data entity is.

For example, the calculation of the second access rating value comprises: adding the at least one edge weight value multiplied by the rating residue value to the first access rating value of the destination node for obtaining the second access rating value. The rating residue value corresponds to the edge connecting the source and destination nodes.

For example, the data removal criterion comprises: the access rating value of a node of the nodes being different than a preset rating threshold value.

For example, the convergence criterion comprises at least one of the highest rating residue value in a given iteration being different than a predetermined residue threshold value; and the average rating residue values in a given iteration being different than the predetermined residue threshold value.

For example, the seed node is one of the node having the highest access rating value; and the node connected to an edge having the highest rating residue value.

For example, the traversing being performed using the Depth-first search, Breadth-first search or a combination thereof.

For example, the data entities are stored in a first storage system, wherein removing a data entity of the data entities to be removed comprises one of storing the data entity in a second storage system having lower performance characteristics than the first storage system, wherein the performance characteristics comprise an I/O response time, and replacing the data entity by a stub file in the first storage system, the stub file indicating the storage destination of the data entity; flagging the data entity as a removable data entity for a predefined time period before removing the data entity; masking at least part of the data entity for user access.

For example, the storage system having highest frequency of access may be backed up independent and more frequently than the other storage system. This may prevent a high I/O penalty due to reading all data on the other storage system to determine if something is to be backed-up.

For example, removing a data entity of the selected data entities further comprises determining an edge connecting a first node, representing the data entity, and a second node; and modifying the data entity represented by the second node for indicating the removal of the data entity represented by the first node. This may be advantageous as it may preserve the quality of the remaining data for providing reliable results. For example, if the data entity representing the second node comprises a link to the data entity represented by the first node, said link may be removed such that to prevent the generation of error messages by the system when such link is used, which may thus save resources used for the generation of the error messages.

For example, removing the data entities corresponding to the selected nodes comprises identifying a set of nodes of the selected nodes that are interconnected by edges; selecting a subset of nodes of the set of nodes based on the dependency category of the edges; requesting a feedback for removing the data entities represented by the subset of nodes; upon receiving the feedback for removing the data entities represented by the subset of nodes removing the data entities represented by the set of nodes. This may be advantageous as it may save resources that would otherwise be required for accessing the data entities (in order to decide whether or not to remove these data entities) other than the data entities represented by the subset of nodes.

The term "data entity" as used herein refers to one of a computer file, container of documents and/or computer files such as a folder or a subfolder, a portion of information contained in a computer file, an image file and a combination thereof.

The term "linked data structure" as used herein refers to a data structure that is a representation of a set of nodes (data records) where some nodes are connected by links. The links that connect pairs of nodes are called edges. The edges may be directed or undirected.

FIG. 1 depicts an exemplary communication system 100 for providing access to media data by multiple users of communication devices 101. The media data may comprise the content available and/or provided from users of communication devices 101. A communication device 101 may comprise a laptop, smartphone, smart TV, video camera or any communication device able to communicate through a network 113 with one or more servers 105.

The network 113 communicatively connects between the various elements of the system 100. The network 113 may be a public network, such as the Internet, a private network, such as a wide area network (WAN), a local area network (LAN), a metro area network (MAN), be it wired or wireless, and any combinations thereof. The network 113 may connect the one or more servers 105 to the communication devices 101, e.g. for social media networking.

Server 105 may comprise a web server that provides, to the communication devices 101, access to a website such as Facebook, Twitter, YouTube, Flicker, Chowhound, Wikipedia, SharePoint MySpace, YahooGroups etc. The server 105 may also comprise an application server providing access to one or more applications, such as mobile applications (apps), native applications, or any applications that may be executed on a communication device e.g. a smartphone, tablets.

The components of server 105 may include, but are not limited to, one or more processors or processing units 115, a storage system 111, a memory system 107, and a bus 109 that couples various system components including memory system 107 to processor 115. Memory system 107 may include computer system readable media in the form of volatile memory, such as random access memory (RAM) and/or cache memory. Server 105 can communicate with network 113 via network adapter 117. As depicted, network adapter 117 communicates with the other components of server 105 via bus 109.

Storage system 111 may comprise one or more storage tiers. For example, the storage tiers may be included in a parallel network and coordinated by a network protocol or may be included in the same network. The storage tiers have different performance characteristics. The performance characteristics may be for example I/O response time and/or I/O throughput and/or a combination thereof. The storage tiers may be ranked or classified based on their performance characteristics. For example, the storage tier having the lowest I/O response time may be ranked first. Said storage tier may be realized with SSD storage. A second storage tier may have the second lowest I/O response time and may be ranked second; said storage may be realized with fast DS8300 storage.

The term "storage tier" as used herein refers to a collection of one or more storage groups with similar characteristics. A storage group can be in exactly one storage tier. The storage group refers to a named set of areas of persistent and/or non-persistent physical storage available from the operating environment.

The server 105 and storage system 111 may be implemented in separate machines, or may be implemented as separate processes in a single machine.

Memory system 107 is configured to store applications that are executable on the processor 115. For example, the memory system 105 may comprise an operating system as well as application programs. Memory system 107 may comprise a feedback module 123.

The feedback module 123 may receive, request, collect or download data from communication devices 101 so as to form the content of the media data associated with the communication devices 101. For example, the content of the media data may be obtained or generated using a mobile application that is installed and run on communication devices 101. The mobile application may be for example WhatsApp, iMessage etc. In another example, the media data may comprise data shared between users of the communication devices 101 e.g. shared images via a web application such as Flicker, or Facebook etc.

Using the media data, the feedback module 123 may select communication devices 101a-f of the communication devices 101 for forming a group of devices 103a. The feedback module 123 may further select the communication devices 101g-l of the communication devices 101 for forming a second group of devices 103b. For simplicity of the description only two groups are shown; however, the skilled person will easily understand that one or more than two groups may be formed.

For simplicity of the description a communication device 101 may be associated or correspond to a single user such that when referring to a communication device only a single user is concerned. However, the skilled person in the art will easily understand that multiple users may use the same communication device 101 and may belong to different groups 103a-b. For example a first user and a second user may belong to the groups 103a and 103b respectively although they are using the same communication device 101a.

The selection of the communication devices for forming the groups may be based on at least one operational criterion of the communication devices 101. For example, the feedback module 123 may select into a single group communication devices that may be available within the same network. For example, communication devices of the group 103a may belong to a home network, while the communication devices of the group 103b may belong to another network type such as a company network.

In another example, the communication devices of the group 103a may belong to users using the same application e.g. a mobile application that is installed in the set of the communication devices 101a-f. Other operational criteria may comprise common language used for the communication of data between the communication devices 101 and the servers 105.

The communication devices 101 of a given group e.g. 103a may participate and collaborate via Blog, Wiki, or other peer-to-peer networks.

In a further example, all communication devices 101 that communicate through the network 113 with the servers 105 (to generate/provide the media data) may form or belong to a single group. In this case, a group formation act may not be performed by the feedback module 123.

The feedback module 123 may store the media data 125 in the storage system 111. The media data 125 may contain a hierarchy of data entities having data dependencies between them.

The hierarchy of the data entities may be explained with a simplified example of a Wiki or a Blog which is accessed/modified/used by the users of the communication devices 101. In this case, the data entities may comprise a group data or a community data entity associated with each of the groups 103a and 103b or associated with one of the groups 103a and 103b. The group data entity associated with the group 103a may comprise, for example, shared data between the users of the group 103a such as the content of the Wiki e.g. including computer text files and image files etc. that is accessed by the users of the group 103a for reading, modifying, deleting etc. operations. The group data entity may be stored, for example, as a main folder which contains subfolders (i.e. other data entities) that contain content of the Wiki and the Blog respectively. Further, the Wiki may comprise multiple pages e.g. associated with different topics e.g. a Wiki page describing a mobile phone and another Wiki page describing a car. Each Wiki page may be associated with a data entity that contains data related to that wiki page e.g. a computer file storing the text of the Wiki page and image files constituting the Wiki page. In addition, the Wiki page may have different versions, wherein a Wiki page version comprises at least part of a parent Wiki page version e.g. a wiki page version describes an old mobile phone generation while another Wiki page version describes the smartphone. Each of the Wiki page versions may be associated with a data entity. Further, a wiki page version may comprise multiple sub-contents e.g. comments provided by different users. And a comment may be associated with a data entity. In the end, the hierarchy of the data entities is formed starting from the group data entity and ending at the data entity of the comment.

In one embodiment, data dependencies between the data entities may be determined and classified by the feedback module 123 into one or more dependency categories. A data dependency category of a data dependency between a first and a second data entity may be for example a data version dependency category if the first data entity and the second data entity have different versions for the same content e.g. Wild page versions. The data dependency category may further comprise a containment or a nested data dependency category if the content of the first data entity comprises at least part of the content of the second data entity e.g. the relation between the Wiki or the Blog (i.e. subfolders) and the community or group data entity as explained above. The data dependency category may further comprise a tagging data dependency if the first data entity is tagged similar to the second data entity. The tag may be indicative of the content or the location etc. of the data entity that is tagged with said tag. The data dependency category may further comprise a link data dependency category if the first data entity comprises a link pointing to the second data entity. This data classification may be advantageous as it may facilitate or provide an efficient access to the media data. For example, a request to access a first data entity that has a data dependency of containment dependency category with a second data entity may be efficiently satisfied by first accessing the second data entity and then the first data entity.

In one embodiment, the feedback module 123 may generate a linked data structure representing a hierarchy of the data entities. The linked data structure comprises nodes representing the data entities and being connected by edges. Each edge of the edges is associated with the dependency category of the data dependency between the two data entities represented by the two nodes connected by the edge.

Following the example of the Wiki, the linked data structure 126 as shown in FIG. 1 represents the hierarchy of the data entities associated with the Wiki. For example, a node 126a is associated to the group data entity, and another node 126b is associated to a Wiki page version. Each of the edges 127, is associated with a given dependency category. For example, the edges 127a, 127b, 127c, 127d, 127e are associated with a nested, link, embedding/containment, tagging, data version dependency categories respectively.

Providing such linked data structure representing the hierarchy of the data entities may be advantageous as it may facilitate the access to the media data e.g. as it may allow an easy and targeted access to a specific data entity of the media data.

Figure 2:
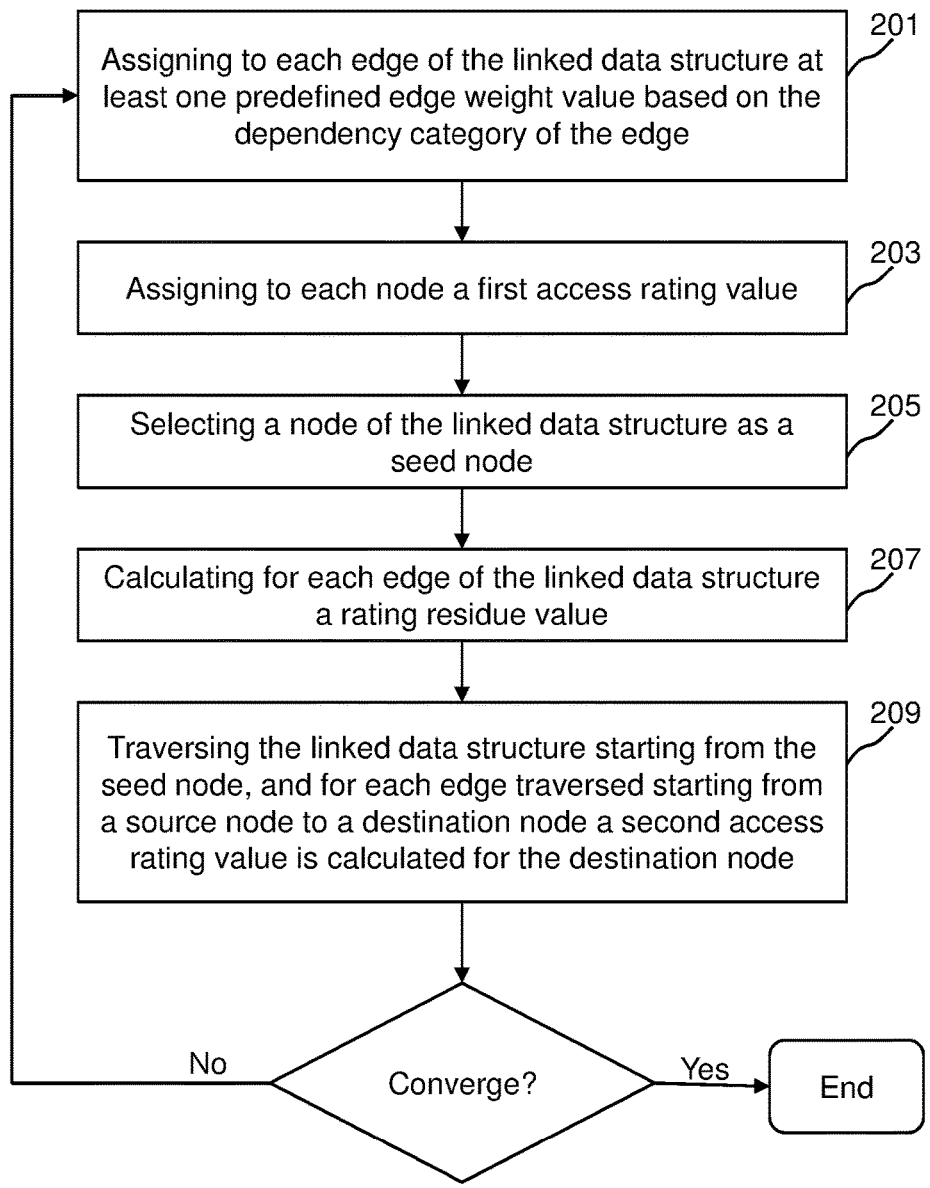
FIG. 2 is a flowchart of a method for scoring or rating media data.

FIG. 2 is a flowchart of a method for scoring or rating media data such as the media data stored in the storage system 111.

In step 201, the generated linked data structure e.g. 126 may be used for assigning to each edge of the linked data structure at least one predefined edge weight value based on the dependency category of the edge. The at least one edge weight value of an edge connecting a first and a second node representing a first and a second data entity respectively comprises: if the dependency category of the edge comprises the containment data dependency category the at least one edge weight value may be a fraction of the first access rating value of the first node when the link data structure is traversed from the first node to the second node. The fraction of the first access rating value is between 0 and 1 (i.e. 0% to 100%). If the dependency category of the edge comprises the data version dependency category the at least one edge weight value may be the percentage of the common content between the first data entity and the second data entity.

The at least one edge weight value may comprise a value in the range [0, 1]. For example, if the dependency category of the edge comprises the containment data dependency category the at least one edge value is equal to 1.

The at least one edge weight value may be constrained to a value less or equal to 1 so as to guarantee that the iteration process of the communication method may converge and the changes between the access rating values of each of the nodes get smaller with each iteration.

For example, an edge linking first and second nodes may be assigned two edge weight values. Each of the two edge weight values is associated with a direction of the traversal of the edge i.e. one edge weight value for the traversal direction from the first node to the second node and another edge weight value for a traversal direction from the second node to the first node.

In step 203, each node of the nodes is assigned a first access rating value (e.g. freshness of the data entity) quantifying the access, by at least part of the multiple users, to the data entity represented by the node. The first access rating value of a data entity is derived from at least one of: a total number of accesses to the data entity in a predefined time interval; an average number of accesses per user of the multiple users to the data entity in the predefined time interval; and an assigned rating value from a user of the multiple users, the assigned rating value being indicative of a content quality of the data entity. For example, if the content of a data entity relates to a description of a new electronic device the user may assign the data entity a higher access rating value compared to a content describing an outdated or old description of the electronic device.

The first access rating value may be the number of views or opening for reading a given data entity. If of a Facebook application the first access rating value may be the number of "likes". The first access rating value may depend on the user who accesses the data entity. For example, a ranked list of users may be used so as to assign to the highest ranked user a higher access rating value. The ranking may be based, for example, on the access right (i.e. access control list (ACL)) given to a user to access the data entity. For example, the administrator having all permissions to access the data entity may be first ranked (higher ranking), and the user having a read access only to the data entity may be last ranked (lowest ranking).

In step 205, a node of the nodes of the linked data structure is selected as a seed node. The seed node may be the node having the highest access rating value, or the node connected to an edge having the highest rating residue value as defined below.

In step 207, for each edge of the linked data structure a rating residue value is calculated as the difference between the two first access rating values of the nodes connected by the edge.

In step 209, the linked data structure is traversed starting from the seed node and for each edge traversed starting from a source node to a destination node a second access rating value is calculated for the destination node using the at least one edge weight value of the edge and the first access rating value of the destination node and the source node.

The steps 205-209 are repeated using the second access rating values as the first access rating values until at least part of the rating residue values meet a predefined convergence criterion. The convergence criterion comprises at least one of: the highest rating residue value in a given iteration being different than a predetermined residue threshold value; and the average rating residue values in a given iteration being different than the predetermined residue threshold value. For example, rating residues values of all the edges may be compared and the highest rating residue value is selected. Then the highest rating residue value may be compared to a predetermined residue threshold value e.g. if the highest rating residue value is smaller than 0.1 the convergence criterion is met.

The fact that the at least one edge weight value is always chosen within the range of values [0, 1] may ensure together with the chosen convergence criterion that the repeated process of steps 205-209 converges. Convergence may be achieved, as the sum of access rating values of all nodes of a graph (i.e. linked data structure) cannot be higher than the number of nodes times the highest access rating value in the graph (assuming all edges use the highest edge weigh value of one).

A simplified example is showed with reference to FIG. 3a-FIG. 3d, where a linked data structure 300 comprising four nodes is shown. Node 301 represents a Wiki data entity. Nodes 303 and 305 represent different pages of the Wild respectively. Node 307 represents a data entity which is a comment (i.e. text) in the Wild page represented by the node 307.

Edge 309 is associated with the nested data dependency category since the two Wiki pages A and B represented by nodes 303, 305 are nested from the main Wiki represented by node 301. Edge 311 is associated with an embedding data dependency category since the comment is part of the Wiki page A. Edge 313 is associated with a link data dependency category since for example Wiki page B contains a link to the wiki page A. The Edges 309, 311 and 313 are associated with predefined edge weight values 0.75, 1 and x/(30+x) respectively.

(a*x/(b+x) is a hyperbole function that may converge to a, where a=<1, where b is the x where half of the access rating value (e.g. freshness, number of views etc.) of a given first node is originated from a second node connected to the first node via an edge. For example, the half number of views of a first web page represented by the first node is originated from the views of a second web page having a link to the first web page and represented by the second node (i.e. half of the views of the first web pages is originated from a click on the link of the second web page that is contained in the first web page). b=30 for this example.

Figure 3A:
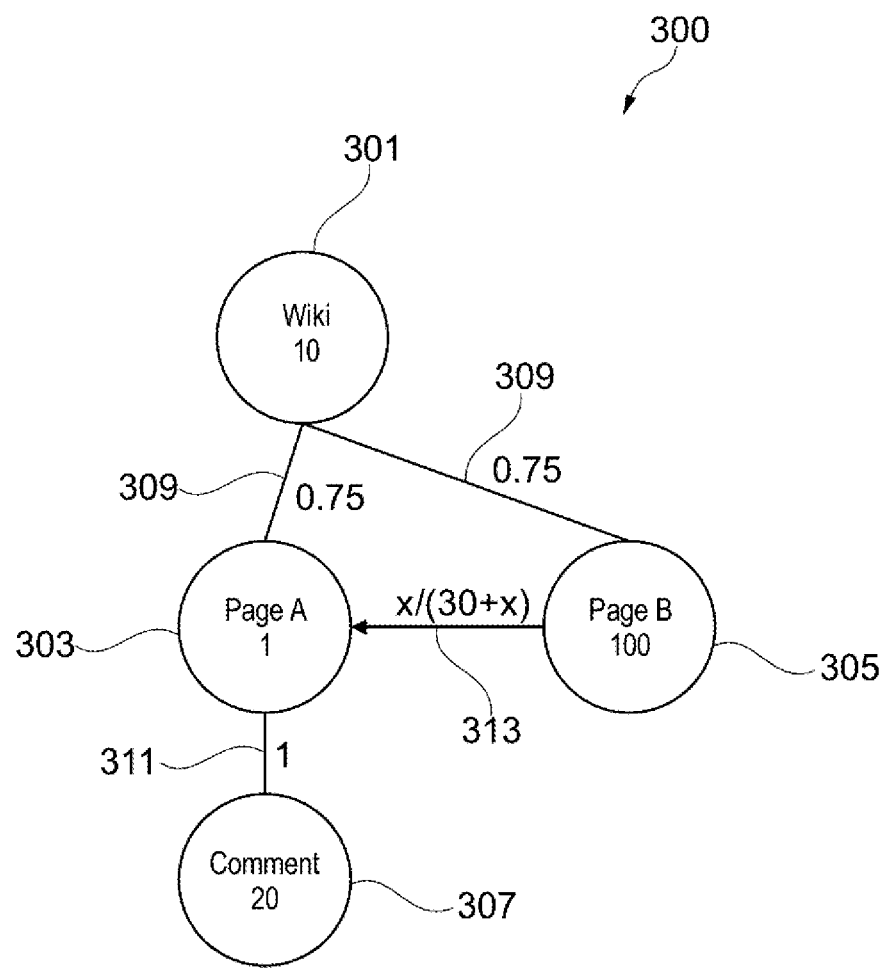
FIGS. 3a, 3b, 3c and 3d illustrate the steps of a method for traversing a linked data structure.

As shown in FIG. 3a, nodes 301-307 are associated with respective access rating values 10, 1, 100 and 20. These access rating values (e.g. freshness values) are calculated from attributes over time like E.g. view count of the Wild: 10 views in last week, Page A: 1 view in last week, Page B: 100 views in last week and comment: 20 views in last week.

In a first iteration, the linked data structure 300 may be traversed starting from node 305 having the highest access rating value i.e. 100. For each node of nodes 301, 303 and 307 a second access rating value may be calculated.

Figure 3B:
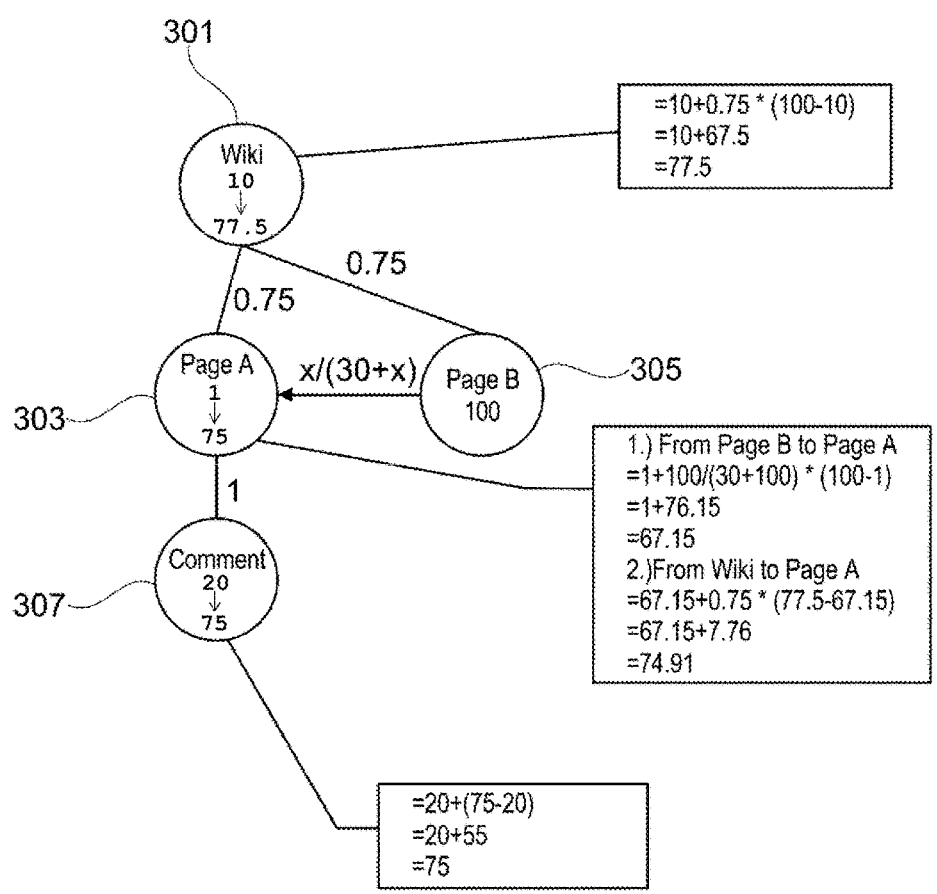

For example, the second access rating value of node 301 may be calculated as shown in FIG. 3b by first calculating the absolute difference between the access rating values of the nodes 301 and 305 (i.e. 100−10) and then using the edge weight value i.e. 0.75 to calculate the second access rating value as follows 10+0.75*(100−10)=77.5. The same method may be used for the other nodes 303 and 307 to reach the values 75 for node 303 and 75 for node 307. The node 303 has two connections to node 301 and node 305. And, determining the second access rating values of page A that is represented by node 303 involves two calculations which are performed iteratively. For example, since the starting node of the traversal was node 305 and since node 303 was reached by passing through node 301, only the calculation of the second access rating value that involves the nodes 301 and node 303 is used. In another example, one of the two calculated values shown in FIG. 3b for the node 303 may be arbitrarily chosen.

Since the highest access rating change done in the second iteration is at Page A represented by node 303 (i.e. 74 which is the absolute difference between the first i.e. 1 and second access rating values i.e. 75) is higher than the predetermined residue threshold value of value 5, a second iteration is to be performed starting from node 305 since it still has the highest access rating value for calculating third access rating values for the nodes 301, 303 and 307.

Figure 3C:
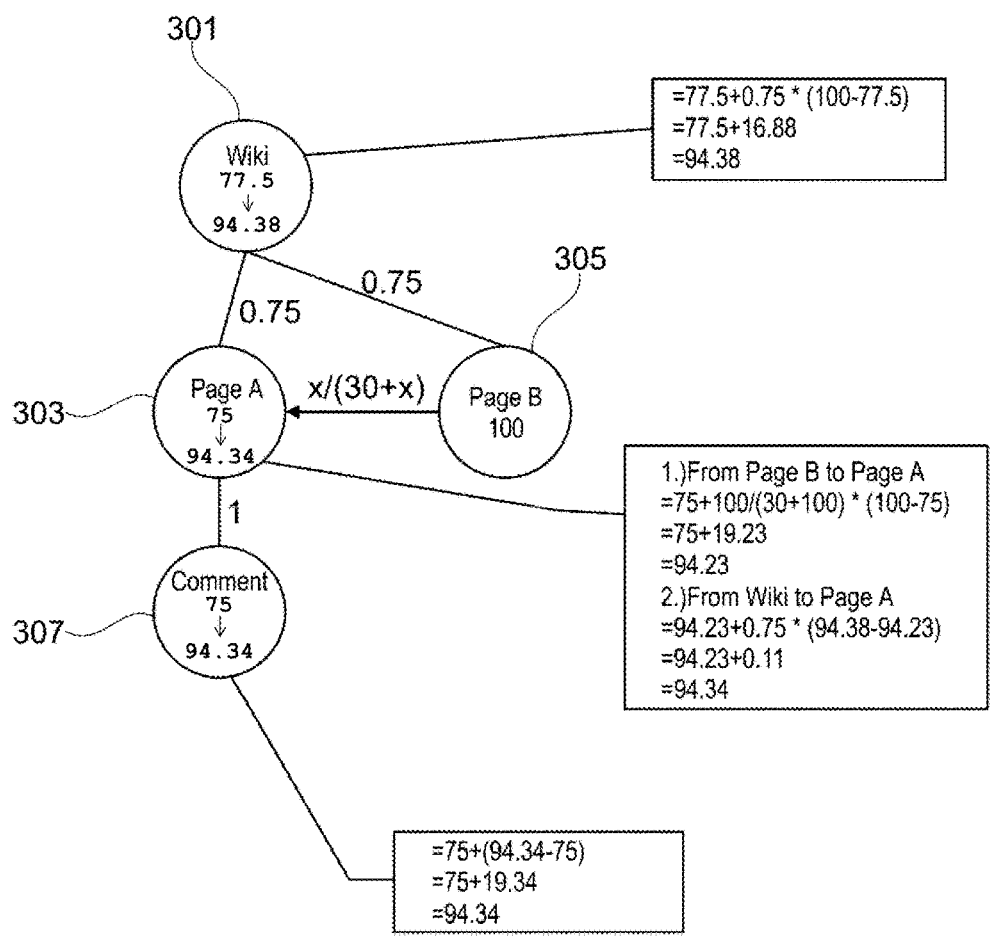

Using the method above for calculating the third access rating values from the second access rating values for obtaining values 94.38, 94.34 and 94.34 for nodes 301, 303 and 307 respectively (cf. FIG. 3c). Since the highest access rating change done in the first iteration is at Page A (i.e. 19.34 which is the absolute difference between the second 75 and third access rating values 94.34) is higher than the predetermined residue threshold value of value 5, a third iteration is to be performed starting from node 305 since it still has the highest access rating value for calculating fourth access rating values for the nodes.

Figure 3D:
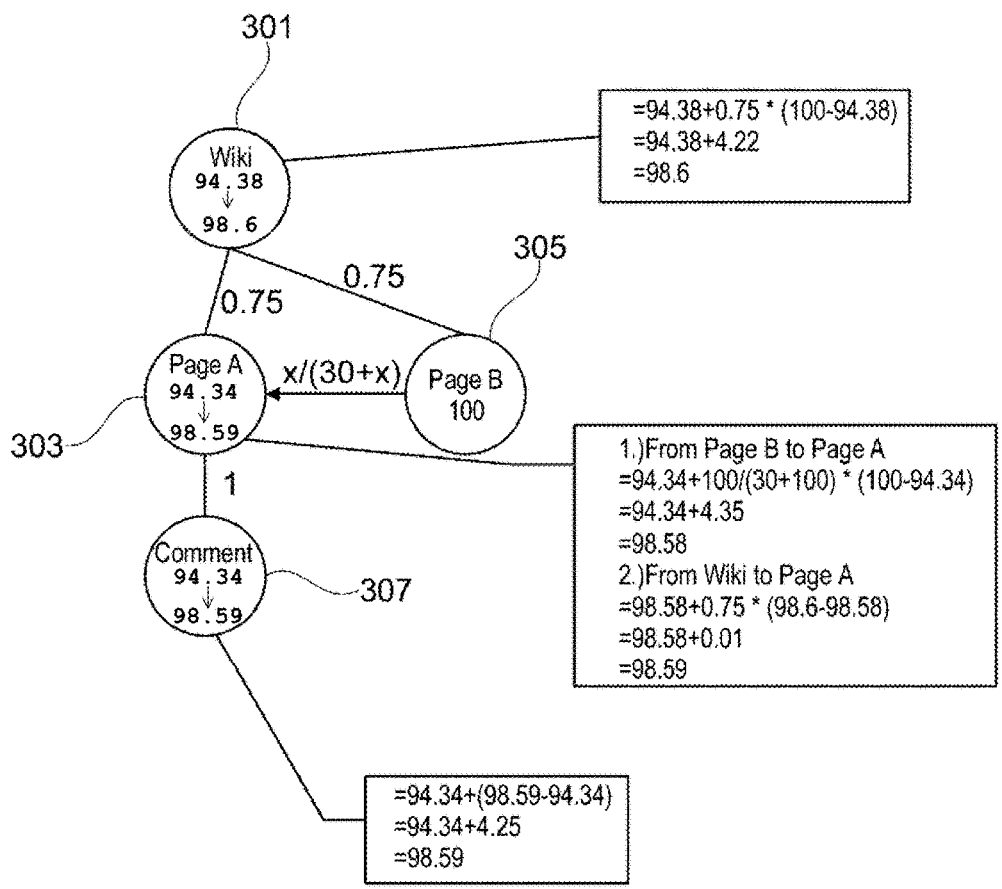

Using the method above for calculating the fourth access rating values from the third access rating values for obtaining values 98.6, 98.59 and 98.59 for nodes 301, 303 and 307 respectively (cf. FIG. 3d). However, the highest access rating change done in the third iteration is at Page A (i.e. 4.35 which is the absolute difference between the third i.e. 94.34 and fourth access rating values i.e. 98.59) is smaller than the predetermined residue threshold value of value 5. Thus, the conversion criterion is met.

The removal criterion according to which, the node having an access rating value below a preset access rating threshold value e.g. 98.6 must be removed, is verified. Since nodes 303 and 307 have access rating values below 98.6 they may be selected for removal.

Figure 4:
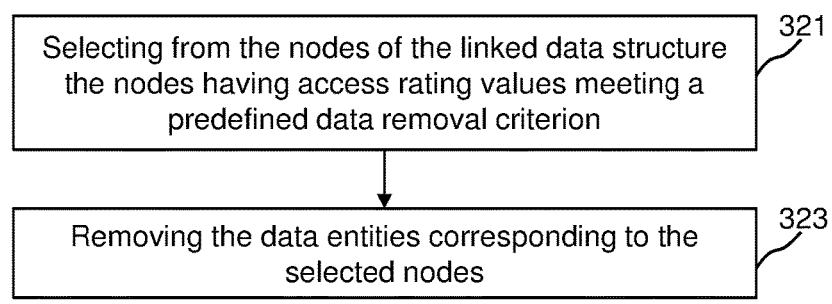
FIG. 4 is a flowchart of a method for removing at least part of media data.

FIG. 4 is a flowchart of a method for removing at least part of media data such as the media data stored in the storage system 111.

In step 321, a linked data structure such as the linked data structure created with the reference to FIG. 1 and FIG. 2 is used to select from the nodes of the linked data structure the nodes having access rating values meeting a predefined data removal criterion. The access rating values associated with the nodes of the linked data structure may be the values obtained after the convergence criterion of the method of FIG. 2 is met. In another example, access rating values associated with the nodes of the linked data structure may be may be any predefined values.

The data removal criterion comprises the access rating value of a node of the nodes being different than a preset rating threshold value. For example, all nodes having an access rating value smaller than 90% are selected.

In step 323, the data entities corresponding to the selected nodes may be removed. For example, the data entities may be stored in a first storage tier of the storage system 111 having the lowest I/O response time. The data entities to be removed may be moved to a second storage tier of the storage system 111 having the highest I/O response time. This may save resources useful for running other data that are e.g. more frequently used by the users i.e. data having high access rating values.

For example, the removed data entities may be replaced by respective stub files in the first storage tier. Each stub file indicates the storage destination (i.e. in the second storage tier) of the corresponding data entity. This may facilitate the access to the removed data since the new destination may not be known to the system. The stub file may also indicate alternative data entities for the removed data entities. The alternative data entities may be the data entities that are maintained and not selected for removal. The content of the alternative data entities may comprise, for example, at least part of the content of the removed data entities. In another example, a selection of the alternative data entities may be received from a user e.g. when the user could not find or have an easy access to the removed data entities he/she may have immediately after that event an access to the alternative data entities.

For example, the data entities to be removed may be flagged as removable data entities for a predefined time period before removing the data entity, such that the user may be aware of that removal. After that, at least part of a data entity to be removed may be masked for user access.

In another example, removing a data entity of the selected data entities comprises: determining an edge connecting a first node, representing the data entity, and a second node; and modifying the data entity represented by the second node for indicating the removal of the data entity represented by the first node.

In another example, removing the data entities corresponding to the selected nodes comprises: identifying a set of nodes of the selected nodes that are interconnected by edges; selecting a subset of nodes of the set of nodes based on the dependency category of the edges; requesting a feedback for removing the data entities represented by the subset of nodes; upon receiving the feedback for removing the data entities represented by the subset of nodes removing the data entities represented by the set of nodes.

For example, if the selected nodes represent Wiki page A, B, C, D, E, F, File G, Wiki H, an analysis of the relation (data dependency categories) of the selected nodes allows an efficient and easy labeling of the action to be performed on the selected nodes to be removed. Some relations, like nested and embedding/containment date dependency categories can be characterized as containment relations. For the given example, this means, that by traversing the graph (i.e. the linked data structure) to find the order containment nodes (i.e. nodes linked via edges having containment data dependency category), the labeling may be appropriately performed. For example, if Wiki pages A, B, C, D, E and File G are part of the Wiki H and are the only content of Wiki H, the appropriate label for the action is: "Remove Wiki H and all it's contents", (i.e. the subset of nodes of the above embodiment represent the Wiki H).

The algorithm for this is to look at the set of candidates, and iteratively remove all candidates that are elements of a container that is also part of the set of candidates until no more candidate labels can be removed. E.g. first iteration: wiki page A, B, C, D, E, F, Wiki H//File G is contained in wiki page F and thus it's redundant to be named in a label for the action Second iteration: Wiki H//Wiki page A, B, C, D, E, F is contained in wiki H and they are the only pages of that wiki. In other terms, if a complete Wiki to be deleted, there is no need to provide for the names of all contained wiki pages, nor is there a need to provide the names of the files that are solely associated with the wiki pages that are to be deleted.

Figure 5:
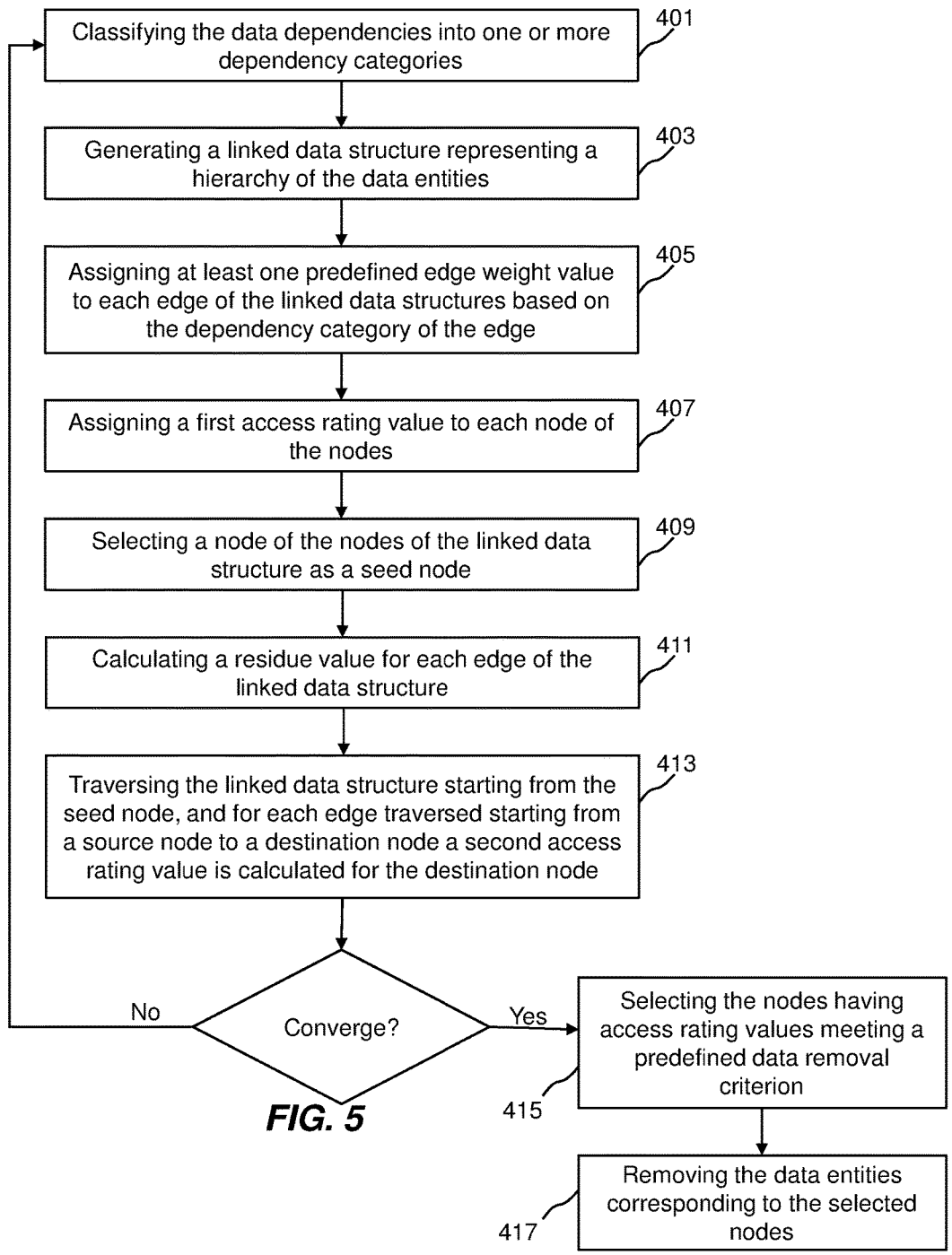
FIG. 5 is a flowchart of a method for an optimal access to media data.

FIG. 5 is a flowchart of a method for an optimal access to media data shared by multiple users, the media data containing data entities having data dependencies between them.

In step 401, the data dependencies are classified into one or more dependency categories.

In step 403, a linked data structure representing a hierarchy of the data entities is generated, the linked data structure comprising nodes representing the data entities and being connected by edges, each edge of the edges being associated with the dependency category of the data dependency between the two data entities represented by the two nodes connected by the edge.

In step 405, at least one predefined edge weight value is assigned to each edge of the linked data structure based on the dependency category of the edge.

In step 407, a first access rating value is assigned to each node of the nodes. The first access rating value quantifies the access, by at least part of the multiple users, to the data entity represented by the node.

In step 409, a node of the nodes of the linked data structure is selected as a seed node.

In step 411, for each edge of the linked data structure a rating residue value is calculated as the difference between the two first access rating values of the nodes connected by the edge.

In step 413, the linked data structure is traversed starting from the seed node and for each edge traversed starting from a source node to a destination node a second access rating value is calculated for the destination node using the at least one edge weight value of the edge and the first access rating value of the destination node and the source node.

Steps 411-413 are repeated using the second access rating values as the first access rating values until at least part of the rating residue values meet a predefined convergence criterion.

In step 415, the nodes having access rating values meeting a predefined data removal criterion are selected from the nodes of the linked data structure.

In step 417, the data entities corresponding to the selected nodes are removed.

Methods to remove the data entities may minimize and mitigate the impact of content phase-out/removal to keep the linked data structure representing the remaining content/data entities intact.

One method to remove the data entities may include offering a phase-out method which does not completely delete the data entities corresponding to the selected nodes but keeps active "stubs" of these data entities in the active content (the active content refers to the data entities that are not to be removed i.e. not selected in step 417). Phased-out documents/data entities may already be transferred to archival storage to realize the intended space/cost savings on primary storage e.g. storage system 111. Still a place holder/stub remains in the active content. Stubs that are kept for removed content/data entities may indicate which content (i.e. data entities) is the best replacement, alternate source for the stale information (i.e. data entities represented by the selected nodes) that has been removed. The information which active document(s) (i.e. data entities that are not to be removed or not selected in step 417) are the best alternatives for phased-out/removed content (the phased-out content refers to the data entities to be removed and represented by the selected nodes) can be determined either based on direct user input or automatically by observing user behavior. One specific way to determine alternate content is by correlating "successful" user interactions (e.g. "like", "recommend", download, close inspection, . . . ) with content shortly after a user has navigated to the phased-out content. This assumes that since the user could not find the information in the phased-out content he/she will typically keep on searching for the next best place holding the data entities that may thus be used as replacement or alternatives of the data entities to be removed.

Another method to remove the data entities may include marking or re-positioning the content before it is actually phased-out/removed. (e.g. content can be moved to a section that is marked as containing presumably stale documents that are phase-out/removal candidates). This prepares the user for the upcoming phase-out/removal.

Another method to remove the data entities may include, instead of globally phasing-out a unit of the content to be removed, a user-centric "tune out" feature may be used. Said feature makes specified content invisible only for a certain user who has decided to tune out content to be removed but said content to be removed is still available in the regular fashion to other users. For example, assuming that a content is to be removed from the system. Then any integrated search may no longer find the content. But the present method may do this search if these searches are transparently federated. Alternatively, if a wiki page is partially removed (E.g. removing old versions of the wiki page) these removed pages may be automatically brought back into the system, when someone wants to list all page versions.

Another method to remove the data entities may include mitigating the impact of missing content by adjusting search and browse actions for the media data to automatically widen the search/browse operation to include phased-out/removed content when search context indicates that the remaining content is not sufficient to satisfy the information need.

Another method to remove the data entities may include proposing or automatically providing alternatives to phased-out/removed content by user action behavior evaluation: e.g., if a user marks a search result entry as outdated but continues to access other search results up to a certain other entry, this last entry could be more relevant or if the user accesses similar content (based on e.g., keywords, tags, metadata) within the same user session after he has flagged content as outdated, this content is candidate for an alternative.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

It is understood that one or more of the aforementioned embodiments may be combined as long as the combined embodiments are not mutually exclusive.

What is claimed is:

1. A communication method for providing access to media data shared by multiple users, the media data containing data entities having data dependencies between them, the method comprising:
    (a) classifying the media data containing a first data entity and a second data entity of two data entities having data dependencies into one or more dependency categories, the two data entities comprising computer files, containers of documents, folders, subfolders, image files, or portions of information contained in computer files;
    (b) generating a linked data structure representing a hierarchy of the data entities, the linked data structure comprising nodes representing the data entities of the media data and being connected by edges, each edge of the edges being associated with the dependency category of the data dependency between the two data entities represented by the two nodes connected by the edge;
    (c) assigning to each edge of the linked data structure at least one predefined edge weight value in the range [0,1) based on the dependency category of the edge to guarantee that an iteration process converges;
    (d) assigning to each node of the nodes a first access rating value quantifying the access, by at least part of the multiple users, to the data entity represented by the node;
    (e) selecting a node of the nodes of the linked data structure as a seed node, wherein the seed node is the node having the highest access rating value or the node connected to an edge having the highest rating residue value;
    (f) for each edge of the linked data structure, calculating a rating residue value as the absolute difference between the two first access rating values of the nodes connected by the edge;
    (g) traversing the linked data structure starting from the seed node, and for each edge traversed starting from a source node to a destination node, calculating for the destination node a second access rating value by adding the at least one edge weight value multiplied by the rating residue value to the first access rating value of the destination node;
    (h) repeating steps (e)-(g) using the second access rating values as the first access rating values until at least part of the rating residue values meet a predefined convergence criterion;
    (i) selecting from the nodes of the linked data structure the nodes having access rating values meeting a predefined data removal criterion; and
    (j) removing the data entities corresponding to the selected nodes.

2. The method of claim 1, wherein the media data are generated using a mobile application being installed on mobile devices of the multiple users, the media data being shared via mobile social media networking, the mobile application comprising a SharePoint application.

3. The method of claim 1, wherein classifying a data dependency between the first and the second data entity of the data entities comprises classifying the data dependency into at least one of: a data version dependency category if the first data entity and the second data entity have different versions of the same content; a containment or nested data dependency category if the content of the first data entity comprises at least part of the content of the second data entity; and a link data dependency category if the first data entity comprises a link pointing to the second data entity.

4. The method of claim 2, wherein assigning at least one predefined edge weight value to an edge of the edges connecting a first and a second node representing the first and the second data entity respectively comprises:
    if the dependency category of the edge comprises the containment data dependency category, then assigning the at least one predefined edge weight value as a fraction of the first access rating value of the first node when the link data structure is traversed from the first node to the second node;
    if the dependency category of the edge comprises the data version dependency category, then assigning the at least one predefined edge weight value as the percentage of the common content between the first data entity and the second data entity; and
    assigning the at least one predefined edge weight value a value in the range [0,1).

5. The method of claim 1, wherein the first access rating value of a data entity is derived from an assigned rating value from a user of the multiple users, the assigned rating value being indicative of a content quality of the data entity.

6. The method of claim 1, wherein the data removal criterion comprises the access rating value of a node of the nodes being different than a preset rating threshold value.

7. The method of claim 1, wherein the convergence criterion comprises at least one of: the highest rating residue value in a given iteration being different than a predetermined residue threshold value; and the average rating residue values in a given iteration being different than the predetermined residue threshold value.

8. The method of claim 1, wherein the traversing is performed using one or both of the Depth-first search, and Breadth-first search.

9. The method of claim 1, wherein the data entities are stored in a first storage system, and removing a data entity of the data entities to be removed comprises one of: storing the data entity in a second storage system having lower performance characteristics than the first storage system, wherein the performance characteristics comprise an I/O response time, and replacing the data entity by a stub file in the first storage system, the stub file indicating the storage destination of the data entity; and masking at least part of the data entity for user access.

10. The method of claim 1, wherein removing a data entity of the selected data entities further comprises:
   determining an edge connecting a first node, representing the data entity, and a second node; and
   modifying the data entity represented by the second node for indicating the removal of the data entity represented by the first node.

11. The method of claim 1, wherein removing the data entities corresponding to the selected nodes comprises:
   identifying a set of nodes of the selected nodes that are interconnected by edges;
   selecting a subset of nodes of the set of nodes based on the dependency category of the edges;
   requesting a feedback for removing the data entities represented by the subset of nodes; and
   upon receiving the feedback for removing the data entities represented by the subset of nodes, removing the data entities represented by the set of nodes.

12. A computer program product for providing access to media data shared by multiple users, the media data containing data entities having data dependencies between them, the computer program product comprising:
   one or more non-transitory computer-readable storage media and program instructions stored on the one or more computer-readable storage media, the program instructions comprising:
   (a) program instructions to classify media data containing a first data entity and a second data entity of the two data entities having the data dependencies into one or more dependency categories, the two data entities comprising computer files, containers of documents, folders, subfolders, image files, or portions of information contained in computer files;
   (b) program instructions to generate a linked data structure representing a hierarchy of the data entities, the linked data structure comprising nodes representing the data entities of the media data and being connected by edges, each edge of the edges being associated with the dependency category of the data dependency between the two data entities represented by the two nodes connected by the edge;
   (c) program instructions to assign to each edge of the linked data structure at least one predefined edge weight value in the range [0,1) based on the dependency category of the edge to guarantee that an iteration process converges;
   (d) program instructions to assign to each node of the nodes a first access rating value quantifying the access, by at least part of the multiple users, to the data entity represented by the node;
   (e) program instructions to select a node of the nodes of the linked data structure as a seed node, wherein the seed node is the node having the highest access rating value or the node connected to an edge having the highest rating residue value;
   (f) program instructions, for each edge of the linked data structure, to calculate a rating residue value as the absolute difference between the two first access rating values of the nodes connected by the edge;
   (g) program instructions to traverse the linked data structure starting from the seed node, and for each edge traversed starting from a source node to a destination node, calculating for the destination node a second access rating value by adding the at least one edge weight value multiplied by the rating residue value to the first access rating value of the destination node the at least one edge weight value of the edge and the first access rating value of the destination node and the source node;
   (h) program instructions to repeat steps (e)-(g) using the second access rating values as the first access rating values until at least part of the rating residue values meet a predefined convergence criterion;
   (i) program instructions to select from the nodes of the linked data structure the nodes having access rating values meeting a predefined data removal criterion; and
   (j) program instructions to remove the data entities corresponding to the selected nodes.

13. A computer system for providing access to media data shared by multiple users, the media data containing data entities having data dependencies between them, the computer system comprising:
   one or more computer processors, one or more computer-readable storage media, and program instructions stored on one or more of the computer-readable storage media for execution by at least one of the one or more processors, the program instructions comprising:
   (a) program instructions to classify the media data containing a first data entity and a second data entity of two data entities having data dependencies into one or more dependency categories, the two data entities comprising computer files, containers of documents, folders, subfolders, image files, or portions of information contained in computer files;
   (b) program instructions to generate a linked data structure representing a hierarchy of the data entities, the linked data structure comprising nodes representing the data entities of the media data and being connected by edges, each edge of the edges being associated with the dependency category of the data dependency between the two data entities represented by the two nodes connected by the edge;
   (c) program instructions to assign to each edge of the linked data structure at least one predefined edge weight value in the range [0,1) based on the dependency category of the edge to guarantee that an iteration process converges;
   (d) program instructions to assign to each node of the nodes a first access rating value quantifying the access, by at least part of the multiple users, to the data entity represented by the node;
   (e) program instructions to select a node of the nodes of the linked data structure as a seed node, wherein the seed node is the node having the highest access rating value or the node connected to an edge having the highest rating residue value;
   (f) program instructions, for each edge of the linked data structure, to calculate a rating residue value as the absolute difference between the two first access rating values of the nodes connected by the edge;

(g) program instructions to traverse the linked data structure starting from the seed node, and for each edge traversed starting from a source node to a destination node, calculating for the destination node a second access rating value by adding the at least one edge weight value multiplied by the rating residue value to the first access rating value of the destination node;

(h) program instructions to repeat steps (e)-(g) using the second access rating values as the first access rating values until at least part of the rating residue values meet a predefined convergence criterion;

(i) program instructions to select from the nodes of the linked data structure the nodes having access rating values meeting a predefined data removal criterion; and (j) program instructions to remove the data entities corresponding to the selected nodes.

* * * * *